United States Patent
Lev et al.

(10) Patent No.: US 8,798,806 B2
(45) Date of Patent: Aug. 5, 2014

(54) ELECTRONIC DEVICE THERMAL MANAGEMENT SYSTEM AND METHOD

(75) Inventors: Jeffrey A. Lev, Cypress, TX (US); Jeffrey Kevin Jeansonne, Houston, TX (US); Walter G. Fry, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1511 days.

(21) Appl. No.: 11/799,185

(22) Filed: Apr. 30, 2007

(65) Prior Publication Data

US 2008/0269954 A1   Oct. 30, 2008

(51) Int. Cl.
*G05D 23/00* (2006.01)

(52) U.S. Cl.
USPC .......... 700/299; 702/139; 713/300; 236/49.3; 361/687; 361/688; 361/690

(58) Field of Classification Search
USPC .......... 236/49.3; 307/117; 361/687–690, 695, 361/699; 700/299, 300; 713/300, 322
See application file for complete search history.

(56) References Cited

U.S. PATENT DOCUMENTS

| | | | |
|---|---|---|---|
| 5,249,741 A * | 10/1993 | Bistline et al. | 236/49.3 |
| 6,309,099 B1 | 10/2001 | Chang | |
| 6,319,114 B1 | 11/2001 | Nair et al. | |
| 6,404,610 B1 | 6/2002 | Chang | |
| 6,487,668 B2 | 11/2002 | Thomas et al. | |
| 6,542,361 B2 * | 4/2003 | Paradis | 361/687 |
| 6,760,649 B2 | 7/2004 | Cohen | |
| 6,795,310 B2 | 9/2004 | Ghosh | |
| 6,859,470 B2 * | 2/2005 | Fu et al. | 372/34 |
| 6,902,646 B2 * | 6/2005 | Mahoney et al. | 156/345.24 |
| 6,928,565 B2 | 8/2005 | Watts, Jr. et al. | |
| 6,975,047 B2 * | 12/2005 | Pippin | 307/117 |
| 7,052,179 B2 | 5/2006 | Tesi | |
| 7,167,993 B1 | 1/2007 | Thomas et al. | |
| 7,212,403 B2 * | 5/2007 | Rockenfell | 361/687 |
| 2004/0047099 A1 * | 3/2004 | Pippin | 361/103 |
| 2005/0049729 A1 | 3/2005 | Culbert et al. | |
| 2006/0087810 A1 | 4/2006 | Rockenfeller | |
| 2006/0117779 A1 * | 6/2006 | Liebenow | 62/259.2 |
| 2007/0027580 A1 | 2/2007 | Ligtenberg et al. | |

FOREIGN PATENT DOCUMENTS

TW   I267727   12/2006

* cited by examiner

*Primary Examiner* — Kavita Padmanabhan
*Assistant Examiner* — Douglas Lee

(57) ABSTRACT

An electronic device thermal management system comprising a thermal management controller configured to maintain a temperature level within a housing of an electronic device based on a signal indicative of a temperature of at least a portion of a wall of the housing of the electronic device.

5 Claims, 4 Drawing Sheets

ELECTRONIC DEVICE THERMAL MANAGEMENT SYSTEM AND METHOD

BACKGROUND

Electronic devices, such as laptop or notebook computers, generate thermal energy during operation, which can result in a temperature increase of all or portions of the external surfaces of such devices (e.g., the housing of the device). However, if the electronic device is placed on a user's lap, for example, thermal energy generated by the electronic device can be felt by the user, thereby creating an uncomfortable experience for the user.

DETAILED DESCRIPTION OF THE DRAWINGS

Various embodiments and the advantages thereof are best understood by referring to FIGS. 1-4 like numerals being used for like and corresponding parts of the various drawings.

Figure 1:
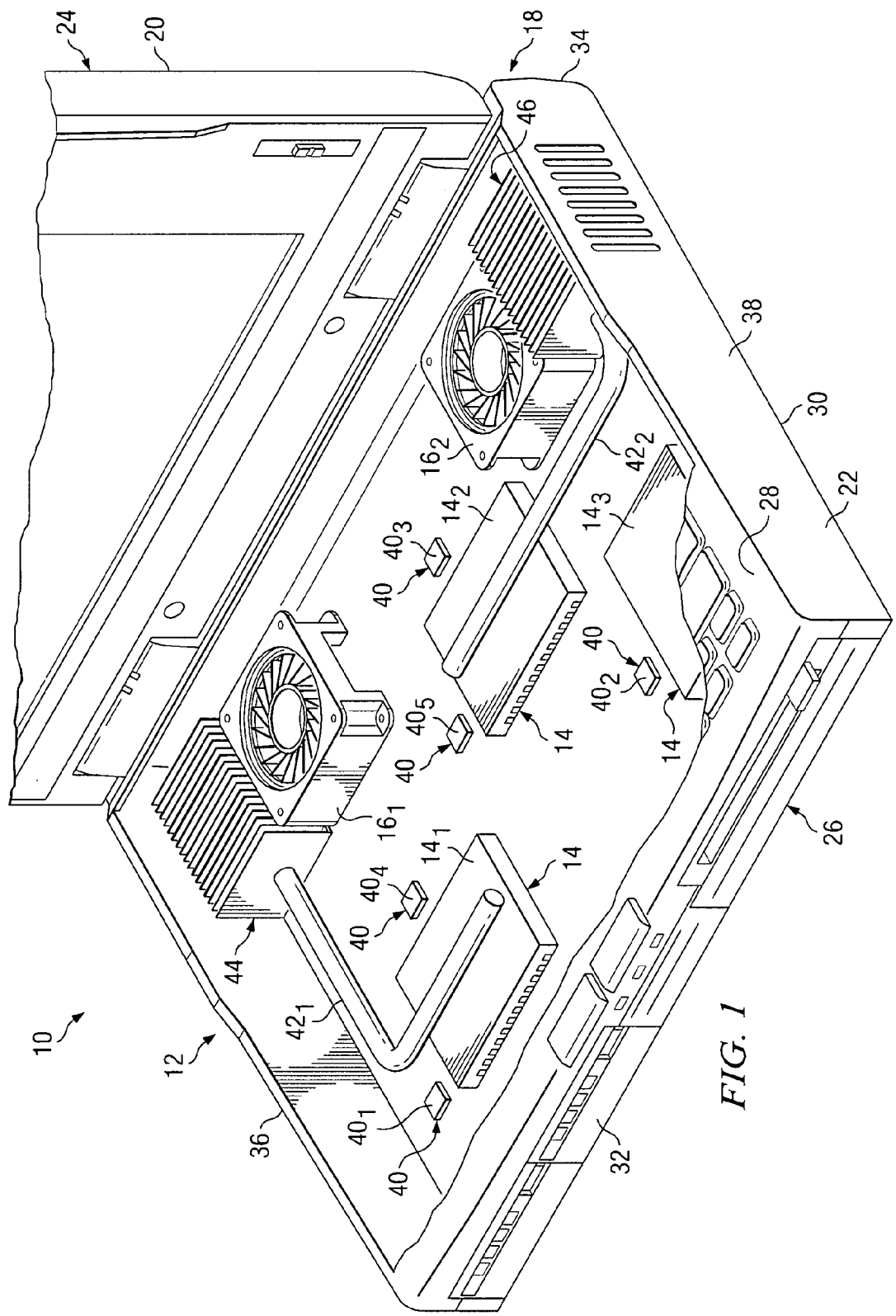
FIG. 1 is a diagram illustrating a perspective view of an electronic device employing an embodiment of a thermal management system to advantage.

FIG. 1 is a diagram illustrating a perspective view of an electronic device 10 employing an embodiment of a thermal management system 12 to advantage. In the embodiment illustrated in FIG. 1, thermal management system 12 is configured to monitor the temperature of portions of the external surfaces of electronic device 10 and dynamically control the use of computer components 14 and/or cooling fans $16_1$ and/or $16_2$ of electronic device 10 in response to detecting a surface temperature above a predetermined temperature/threshold. In the embodiment illustrated in FIG. 1, electronic device 10 comprises a laptop or notebook computer 18; however, it should be understood that electronic device 10 may comprise any type of electronic device such as, but not limited to, a tablet personal computer, a personal digital assistant, a desktop computer, a cellular telephone, a gaming device, an entertainment device or any other type of portable or non-portable electronic device. In the embodiment illustrated in FIG. 1, electronic device 10 comprises a display member 20 rotatably coupled to a base member 22. Display member 20 and base member 22 each comprise a housing 24 and 26, respectively, formed having a number of walls. For example, housing 26 comprises a top wall defining a working surface 28, a bottom wall 30, a front wall 32 a rear wall 34 and a pair of sidewalls 36 and 38.

In operation, thermal management system 12 is configured to dynamically adjust a temperature level within housing 24, thereby adjusting a temperature of walls 28, 30, 32, 34, 36 and/or 38 of electronic device 10, based on a signal indicative of a temperature of walls 28, 30, 32, 34, 36 and/or 38. For example, if a temperature of bottom wall 30 is above the predetermined temperature/threshold (e.g., a temperature making it uncomfortable to rest bottom wall 30 of housing 24 on a user's lap or on any other surface), thermal management system 12 is operable to adjust one or more components 14 and/or the operation and/or speed of the one or more cooling fans $16_1$ and/or $16_2$ within electronic device 10 to reduce the temperature within electronic device 10 and thus wall 30.

In the embodiment illustrated in FIG. 1, thermal management system 12 comprises a plurality of sensors 40 on and/or near housing 24 to measure the temperature of one or more of walls 28, 30, 32, 34, 36 or 38. For example, in FIG. 1, thermal management system 12 comprises a plurality of temperature sensors $40_1$, $40_2$, $40_3$, $40_4$ and $40_5$ spaced apart on bottom wall 30 to detect the surface temperature of bottom wall 30. In FIG. 1, electronic device 10 comprises five sensors $40_1$, $40_2$, $40_3$, $40_4$ and $40_5$, however, it should be understood that a greater or fewer number of sensors 40 may be utilized. In the embodiment illustrated in FIG. 1, sensors 40 are embedded within and/or are coupled directly to bottom wall 30 and are disposed generally adjacent to components 14; however, it should be understood that sensors 40 may be otherwise located and embedded within and/or coupled to any other wall 28, 32, 34, 36 and/or 38 of base member 22 and/or at any other location within base member 22. Components 14 may comprise a variety of different types of devices used in the operation of electronic device 10 that may generate thermal loads within housing 26, thereby increasing the temperature within housing 26 and on walls 28, 30, 32, 34, 36 and/or 38. In the embodiment illustrated in FIG. 1, components 14 comprise a processor $14_1$, a graphics chip $14_2$, and a wireless radio module 143, thermally coupled via heat transport elements $42_1$ and $42_2$ to a pair of heat exchangers 44 and 46, respectively, to dissipate heat generated by processor $14_1$ and graphics chip $14_2$. In the embodiment illustrated in FIG. 1, cooling fans $16_1$ and/or $16_2$ are operable to generate an airflow through housing 26 to dissipate heat generated by components 14 using heat exchangers 44 and/or 46. In operation, sensors 40 monitor the temperature of the interior area of housing 26 by measuring the temperature of walls 28, 30, 32, 34, 36 and/or 38 to enable thermal management system 12 to regulate the heat generated within housing 26 and thus the temperature of walls 28, 30, 32, 34, 36 and/or 38).

Figure 2:
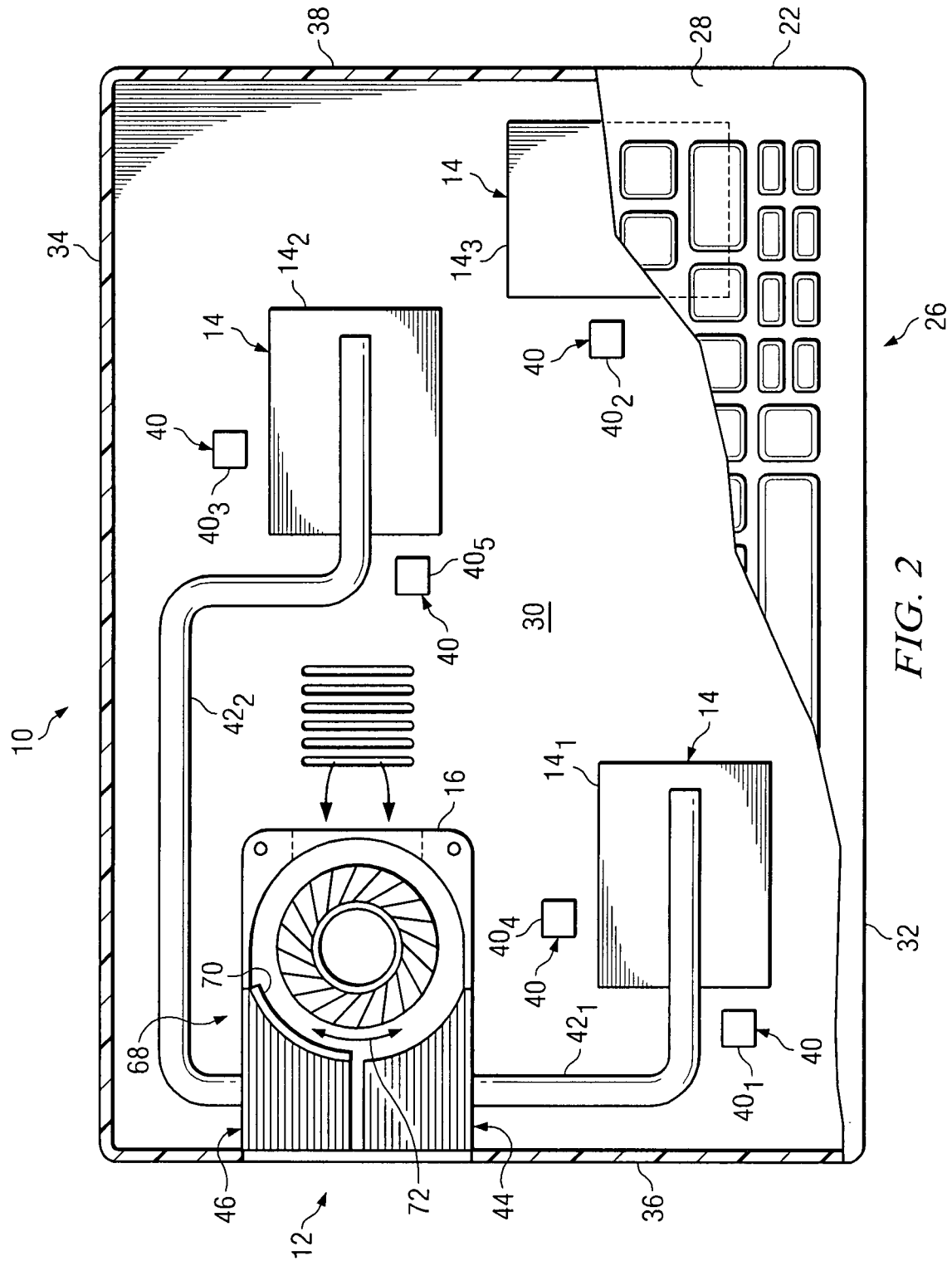
FIG. 2 is a diagram illustrating a perspective view of another embodiment of the electronic device employing the thermal management system of FIG. 1.

FIG. 2 is a diagram illustrating a perspective view of another embodiment of electronic device 10 employing thermal management system 12 of FIG. 1. In the embodiment illustrated in FIG. 2, thermal management system 12 is operable to adjust a baffle system 68 to direct and/or re-direct an airflow generated by cooling fan 16. For example, in the embodiment illustrated in FIG. 2, heat exchangers 44 and 46 are configured adjacent to cooling fan 16 to receiving cooling air. A baffle 70 is movably positionable within cooling fan 16 in the directions of arrow 72 to direct cooling air generated by cooling fan 16 to one or both of heat exchangers 44 and 46. For example, in the embodiment illustrated in FIG. 2, in the event sensors $40_1$ and/or $40_4$ detect a temperature of bottom wall 30 higher than the temperature measured by sensors $40_3$ and/or $40_5$, thermal management system 12 adjusts the position of baffle 70 to at least partially block the airflow through exchanger 46 and otherwise divert all or a portion of the airflow toward exchanger 44 to increase the cooling rate of component $14_1$.

Figure 3:
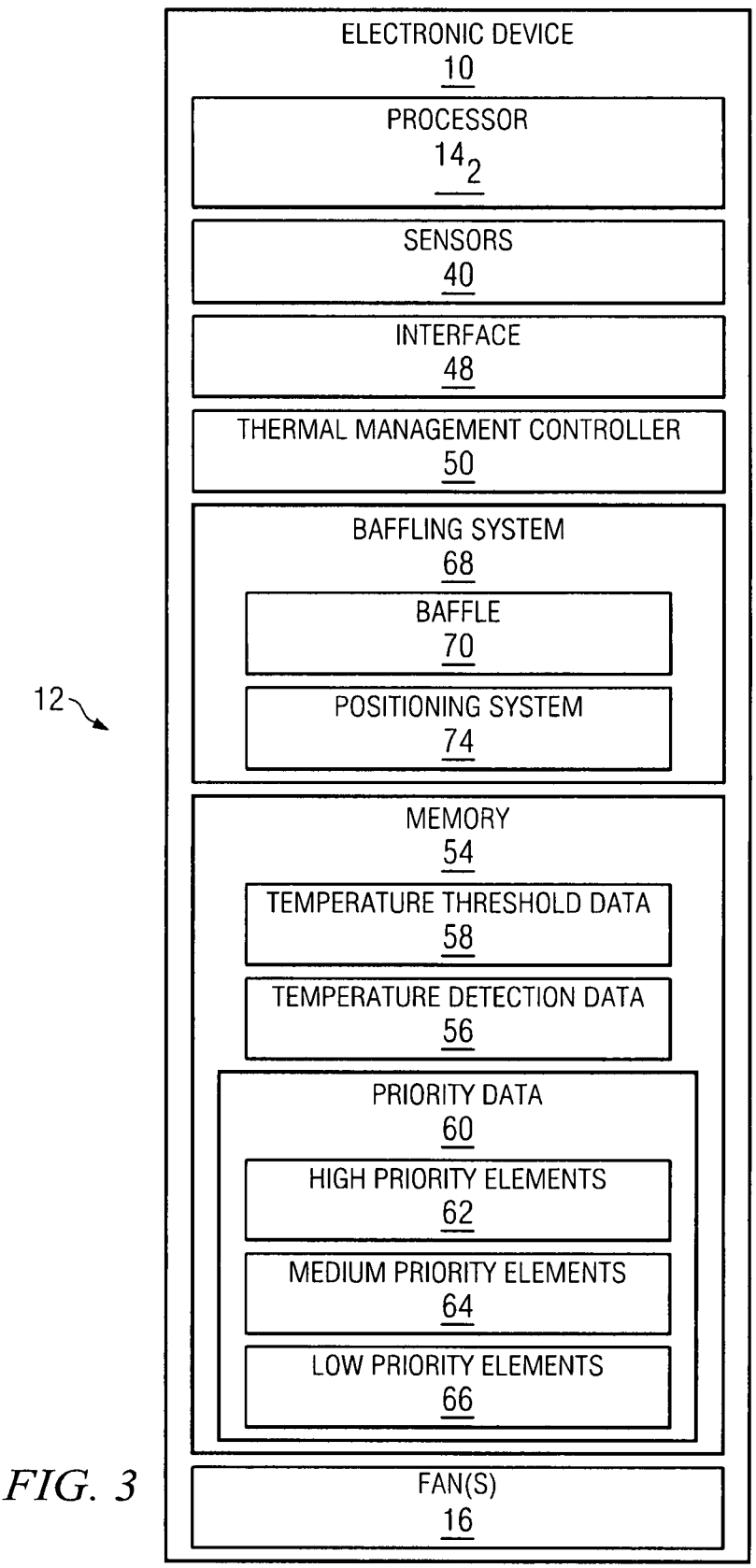
FIG. 3 is a block diagram illustrating the electronic device of FIG. 1.

FIG. 3 is a block diagram illustrating electronic device 10 of FIGS. 1 and 2. In FIG. 3, thermal management system 12 comprises sensor(s) 40 and a thermal management controller 50 configured to receive inputs from sensor(s) 40. In the embodiment illustrated in FIG. 3, electronic device 10 comprises processor $14_2$, sensor(s) 40, an interface 48, baffling system 68, a memory 54 and one or more cooling fans 16. In the embodiment illustrated in FIG. 3, memory 54 comprises temperature detection data 56, temperature threshold data 58 and priority data 60. In FIG. 3, thermal controller 50 may comprise hardware, software, firmware or a combination of hardware, software and firmware. In operation, thermal controller 50 receives temperature data collected from sensor(s) 40 and stores it as temperature detection data 56. Thermal controller 50 compares temperature detection data 56 to temperature threshold data 58 to determine whether temperature detection data 56 is above a predetermined temperature threshold value (e.g., whether the detected temperature is above a predetermined temperature) stored as temperature threshold data 58. For example, in the event a sensor 40 detects a temperature level of bottom wall 30 (FIG. 1) greater than the value stored as temperature threshold data 58 (e.g., the highest acceptable temperature of bottom wall 30), thermal management controller 50 generates a command to adjust the performance of one or more components 14 (e.g., adjusting data transfer rates, turning off and/or reducing a performance level of radio module $14_3$, adjusting a clock frequency of processor $14_1$, etc.), adjusts baffling system 68 and/or adjusts the speed of cooling fans $16_1$ and/or $16_2$.

In the embodiment illustrated in FIG. 3, baffling system 68 comprises baffle 70 and a positioning system 74 for variably positioning baffle 70 to direct and/or redirect cooling air flow through electronic device 10. According to some embodiments, positioning system 74 may comprise an electric motor to drive a worm gear and/or any other mechanism to variably position baffle 70 within electronic device 10; however, it should be understood that other methods of variably positioning baffle 70 are available.

In the embodiment illustrated in FIG. 3, temperature detection data 56 comprises information associated with signals collected and/or otherwise received by sensor(s) 40 such as temperature data (the temperature measured by a particular sensor 40). Temperature threshold data 58 comprises information associated with known and/or predetermined signal values that are used to evaluate temperature detection data 56 to determine whether the operation of electronic device 10 should be modified (e.g., reduce the performance of processor $14_1$, graphics chip $14_2$ and/or radio module $14_3$, turning on and/or increasing a speed of fan(s) $16_1$ and/or $16_2$, adjusting baffling system 68, etc.) to reduce the heat generated within housing 26 and thus the warming of walls 28, 30, 32, 34, 36 and/or 38. For example, acceptable threshold temperature levels associated with bottom wall 30 of electronic device 10 may be approximately ninety degrees Fahrenheit such that in the event electronic device 10 is utilized on a user's lap, thermal energy generated within electronic device 10 prevents warming of bottom wall 30 to an uncomfortable level. Accordingly, if temperature detection data 56 is greater than ninety degrees Fahrenheit, thermal management controller 50 sends a signal to increase the speed of fan(s) 16 to dissipate thermal energy, to adjust baffling system 68 via positioning system 74, and/or to reduce the performance of one or more components 14 to decrease the thermal output of the one or more components 14. In some embodiments, thermal controller 50 is configured to automatically regulate the temperature of electronic device 10 via input from sensor(s) 40; however, it should be understood that, additionally or alternatively, thermal controller 50 may be configured to enable a user to selectively regulate the temperature within electronic device 10 via interface 48. For example, in response to an undesired/uncomfortable temperature of bottom wall 30 (e.g. an uncomfortable temperature of bottom wall 30 while resting on a user's lap), thermal controller 50 is configured to enable a user to selectively adjust the performance of electronic device 10 and/or increase the speed of cooling fan(s) 16 reduce the amount of thermal energy generated therein and thus the temperature of bottom wall 30. Furthermore, interface 48 enables a user to adjust and/or set temperature threshold data 58. For example, in the event a user desires to withstand a higher temperature level of bottom wall 30 (e.g., in instances when electronic device 10 is utilized on a table or surface other than the user's lap), a user can adjust the upper threshold of temperature threshold data 58 via interface 48 to accommodate the increased temperatures.

In FIG. 3, priority data 60 comprises a prioritization of the various components 12 (e.g., a level of importance to a user of electronic device 10) to facilitate control of use of components 12 to enable operation of electronic device 10 below a designated temperature. For example, in the embodiment illustrated in FIG. 3, priority data 60 comprises a listing of high priority elements 62, medium priority elements 64 and low priority elements 66. High priority elements 62 generally comprise an identification of one or more components 14 having a generally high level of priority of use by a user of electronic device 10. Low priority elements 66 generally comprise an identification of one or more components 14 considered as having a low level of priority of use by a user of electronic device 10. Correspondingly, medium priority elements 64 comprise an identification of one or more components 14 having a priority level of use greater than low priority elements 66 but less than high priority elements 62. It should be understood that the priority levels used herein are for illustrative purposes only as the prioritization could be more or less granular.

In operation, thermal management controller 50 communicates with sensor(s) 40 to monitor the temperatures of wall 28, 30, 32, 34, 36 and/or 38 of electronic device 10. If the measured temperature of any of walls 28, 30, 32, 34, 36 and/or 38 is above temperature threshold data 58, thermal controller 50 automatically controls and/or adjusts use of components 14 and/or fans 16 based on priority data 60 to enable use of electronic device 10 below the threshold temperature level. For example, if the temperature of any one of the walls 28, 30, 32, 34, 36 and/or 38 increases above threshold temperature data 58, thermal controller 50 automatically accesses priority data 60 and automatically controls and/or cessates use of one or components 14, adjusts the speed of one or more cooling fans 16 and/or adjusts baffling system 68 (FIG. 2) to enable use of electronic device 10 at temperature levels at or below temperature threshold data 58. Preferably, thermal management controller 50 controls and/or ceases use of low priority elements 66 before controlling and/or cessating use of medium priority elements 64, and controls and/or cessates use of medium priority elements 64 before controlling and/or cessating use of high priority elements 62. Thus, if an e-mail application executed by processor $14_1$ is identified as a low priority element 66, thermal management controller 50 sends a signal to processor $14_1$ to automatically close and/or cessate use of the e-mail application. For example, in response to closing of the e-mail application, if temperature detection data 56 falls within temperature threshold data 58 (e.g., the temperature of wall 30 falls within temperature threshold data 58), no further action by thermal controller 50 may be necessary. However, if the temperature of wall 30 remains outside of temperature threshold data 58, thermal management controller 50 proceeds to control and/or cease use of additional low priority elements 66, medium priority elements 64 and/or high priority elements 62 to enable use of the electronic device 10 within the values of temperature threshold data 58. It should be understood that thermal controller 50 may be configured to analyze and/or control use of components 14, cooling fans 16 and baffle 70 on a continuous or periodic basis.

In the embodiment illustrated in FIGS. 1-3, thermal management controller 50 is operable to dynamically adjust operation of electronic device 10 such that the temperature within housing 26 reduces and/or substantially eliminates the likelihood of walls 28, 30, 32, 34, 36 and/or 38 warming above temperature threshold data 58. For example, in the event sensor 40₄ detects a temperature of a portion of bottom wall 30 adjacent to processor 14, above temperature threshold data 58, thermal management controller 50 sends a signal to increase the speed of fan 16₁ to increase the cooling rate of processor 14₁ via increased thermal dissipation within heat exchanger 46. Additionally and/or alternatively, thermal management controller 50 can optionally send a signal to control (e.g., reduce) the performance of processor 14₁ based on, for example, priority data 60. Likewise, in the event sensor 40₃ detects a temperature well below temperature threshold data 58, thermal management controller 50 sends a signal to turn off and/or otherwise decrease the speed of fan 16₂ to utilize less energy and/or increase the performance of graphics chip 14₂.

Figure 4:
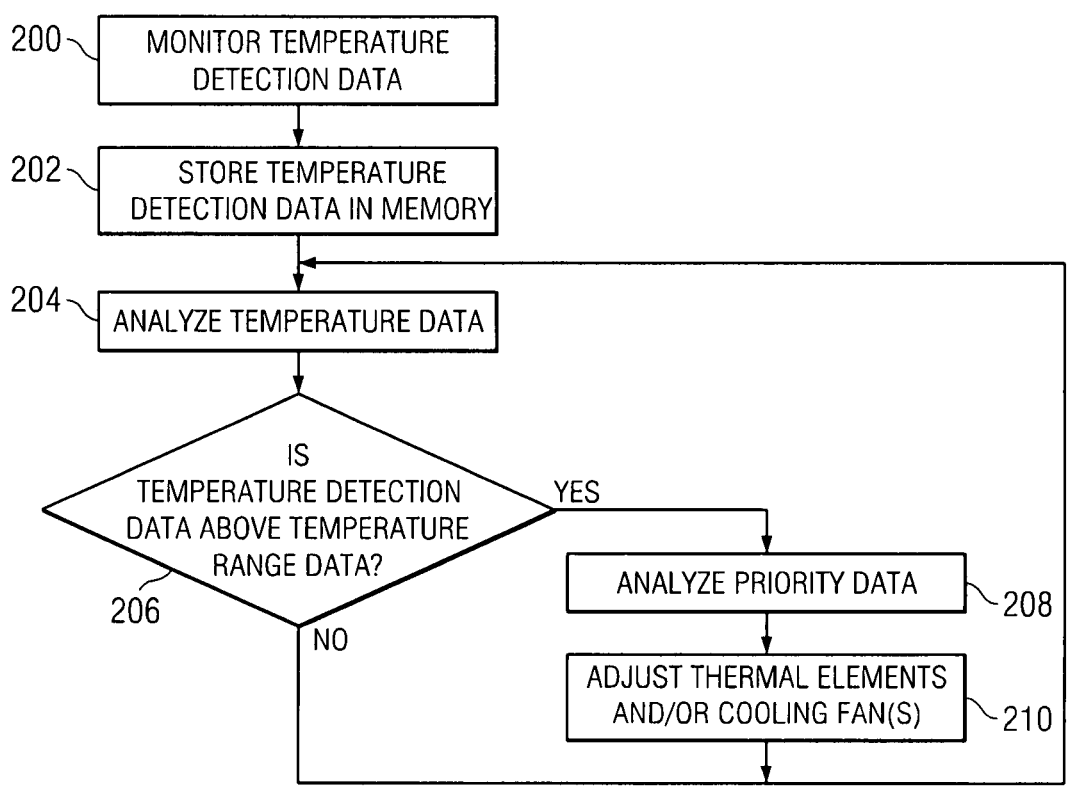
FIG. 4 is a flow diagram illustrating an embodiment of a thermal management method.

FIG. 4 is a flow diagram illustrating an embodiment of a thermal management method. In the embodiment illustrated in FIG. 4, the method begins at block 200 where thermal management controller 50 monitors temperature detection data 56 acquired and/or otherwise detected by sensor(s) 40. For example, in the embodiment illustrated in FIG. 3, thermal controller 50 monitors the temperature of bottom wall 30 via sensors 40 (FIG. 1). At block 202, the temperature detected by sensors 40 is stored in memory as temperature detection data 56. At block 204, thermal controller 50 analyzes temperature detection data 56 using temperature threshold data 58 to determine whether the temperature within electronic device 10 should be decreased based on the temperatures detected by sensor(s) 40. At decisional block 206, thermal controller 50 makes a determination as to whether temperature detection data 56 is above a predetermined threshold as defined by temperature threshold data 58 for walls 28, 30, 32, 34, 36 and/or 38. If the temperature detection data 56 is above a predetermined threshold, the method proceeds to block 208, where thermal management controller 50 analyzes priority data 60 to automatically control and/or cessate use of one or more components 14, to automatically adjust the speed of one or more cooling fans 16 and/or to adjust baffling system 68 to enable use of electronic device 10 at temperature levels below temperature threshold data 58 as indicated at block 210. The method proceeds to block 204 wherein controller 50 continues analyzing temperature detection data 56. In the event temperature detection data 56 is determined not to be above a predetermined threshold at decisional block 206, the method proceeds to block 204 wherein controller 50 continues analyzing temperature detection data 56.

Thus, embodiments of thermal management system 12 monitor and regulate the temperature of electronic device 10 (e.g. housing 24 and/or 26). In particular, embodiments of thermal management system 12 regulate the temperature of surfaces 28, 30, 32, 34, 36 and/or 38 of electronic device 10 by automatically adjusting components 14, one or more cooling fans 16 and/or a baffling system 68 therein.

What is claimed is:

1. An electronic device thermal management system, comprising:
a thermal management controller configured to maintain a temperature level within a housing of an electronic device below a predetermined temperature based on at least one continuous signal indicative of a temperature of at least a portion of an external wall of the housing of the electronic device, wherein the controller is configured to adjust a performance level of at least one component based on a prioritization of components within the housing based on the temperature of the external wall.

2. The system of claim 1, wherein the prioritization comprises at least two different priority levels of the components.

3. An electronic device thermal management system, comprising:
a thermal management controller configured to maintain a temperature level within a housing of an electronic device below a predetermined temperature based on at least one continuous signal indicative of a temperature of at least a portion of an external wall of the housing of the electronic device, wherein the controller adjusts a baffling system based on the temperature of the external wall.

4. A thermal management method, comprising:
maintaining a temperature level within a housing of an electronic device below a predetermined threshold based on at least one continuous signal indicative of a temperature of at least a portion of an external wall of the housing of the electronic device; and
adjusting a baffling system based on the temperature of at least a portion of the external wall.

5. An electronic device thermal management system, comprising:
a means for maintaining a temperature level within a housing of an electronic means below a predetermined threshold temperature based on at least one continuous signal means indicative of a temperature of at least a portion of an external wall of the housing of the electronic means; and
at least one means for measuring a temperature disposed on the external wall of the electronic means, wherein the maintaining means positions a baffling means based on the temperature of the external wall of the housing.

* * * * *